Jan. 25, 1927.  W. F. KASPER  1,615,709
WHEEL
Filed Feb. 4, 1926  2 Sheets-Sheet 1

Inventor
WALTER F. KASPER
By Paul, Paul & Moore
ATTORNEYS

Jan. 25, 1927.

W. F. KASPER 1,615,709

WHEEL

Filed Feb. 4, 1926

Inventor
WALTER F. KASPER

ATTORNEYS

Patented Jan. 25, 1927.

1,615,709

UNITED STATES PATENT OFFICE.

WALTER F. KASPER, OF FAIRMONT, MINNESOTA, ASSIGNOR TO FAIRMONT RAILWAY MOTORS, INC., OF FAIRMONT, MINNESOTA, A CORPORATION OF MINNESOTA.

WHEEL.

Application filed February 4, 1926. Serial No. 85,941.

My invention relates to wheels adapted particularly for railway trucks or cars and the objects of the invention are: to eliminate rivets now generally used in three-piece wheels for securing the hub to the center disk, thereby avoiding the difficulty of keeping these rivets tight in the use of the wheel; to provide a wheel in which provision is made for carrying the load on a shoulder of the rim rather than on the bolts which connect the center disk with the rim, thus eliminating danger of shearing of these bolts; to provide a wheel in which the fiber bushing insulation between the axle and the wheel hub need not be disturbed in changing tires, it being unnecessary to remove the center spider from the axle when the rim becomes worn; and to provide a wheel which will permit the use of a pressed steel rim rolled from strip steel and welded, an operation that is less expensive than pressing the rim from a solid sheet.

Other objects of the invention will appear from the following detailed description.

In the accompanying drawing forming part of this specification,

Figure 2:
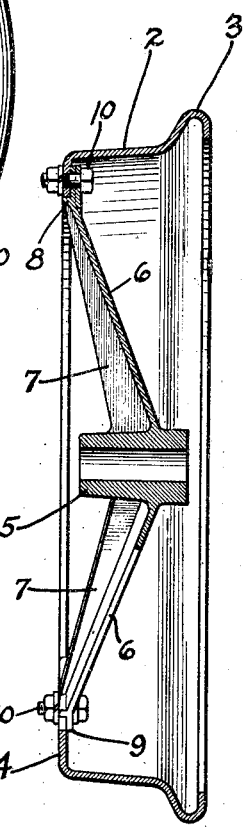
Figure 2 is a sectional view of the same on line 2—2 of Figure 1.
Figure 3:
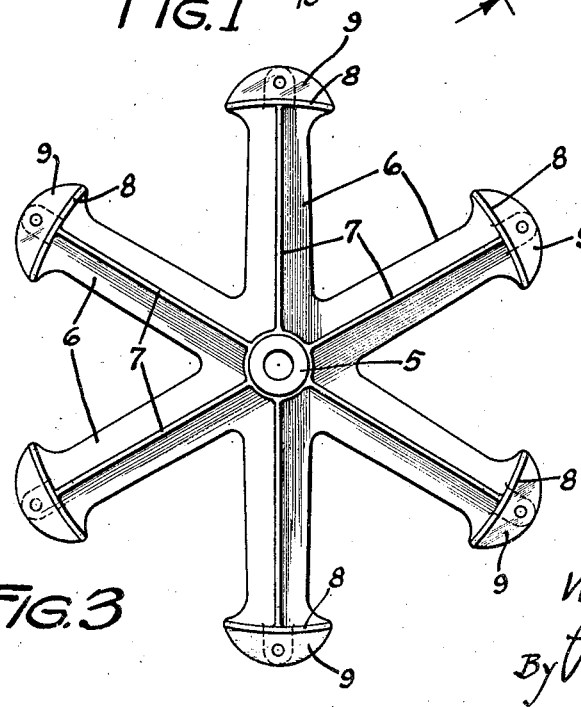
Figure 3 is a view of the center spider and hub removed from the rim.

In the drawing, 2 represents a pressed steel rim rolled from strip steel and welded and having the usual flange 3 on one edge which bears on the side of the rail head as usual in wheels of this type, the surface of the wheel from the flange to the opposite edge being adapted to roll on the top of the rail. The operation of rolling this rim from strip steel is less expensive than the usual construction. 4 is an annular flange projecting inwardly from the edge of the rim, being formed at his point when the rim is rolled and preferably extending continuously around the rim. 5 represents a cast hub having integral arms or spokes 6 radiating therefrom and provided preferably with strengthening ribs 7. The outer ends of these arms have shoulders 8 formed thereon which are seated against the edge of the flange 4 to transmit the load from the hub directly to the flange. The ends of the arms 6 have webs 9 formed thereon and bolt 10 pass through these webs and through the flange 4 and secure them firmly together. The arms 6 and the central hub are integral or formed in one piece and as indicated in Figure 2, these arms extend diagonally or at an incline with respect to the axis of the hub, so that the hub is centered in the rim while the load thereon is transmitted through the radiating arms to the rim flange. There may be any suitable number of these radiating arms provided and they may be stiffened or braced in any suitable manner and in case of breakage of an arm or wear of the rim, the bolts may be removed and in case of removal of the rim, it will not be necessary to disturb the hub on its axle. The old rim can be taken off and a new one easily substituted therefor. Hence it is possible to easily and quickly make repairs and it is not necessary to discard the entire wheel in case the rim, or as sometimes happens, an arm or spoke connecting the rim with the hub is broken.

Figure 4:
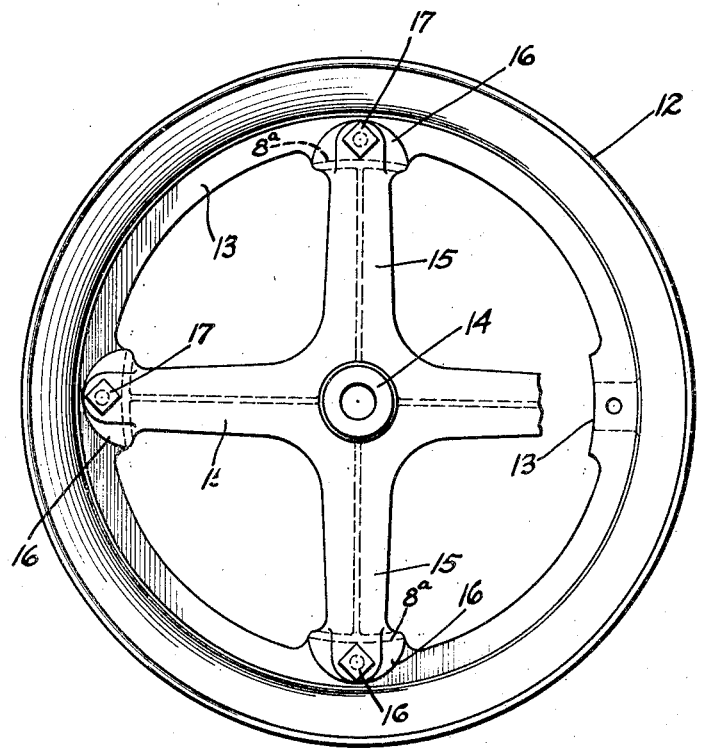
Figure 4 is a view of the wheel with a cast rim.
Figure 5:
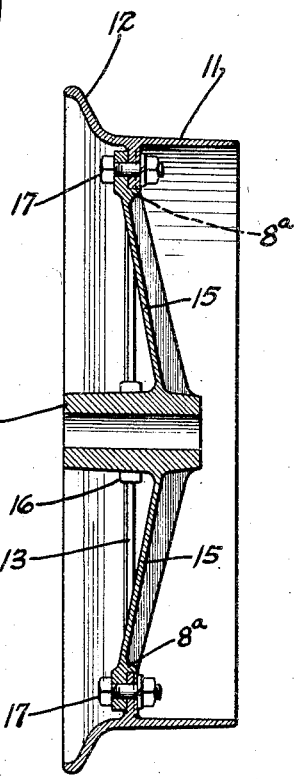
Figure 5 is a sectional view through the rim and spider.
Figure 6:
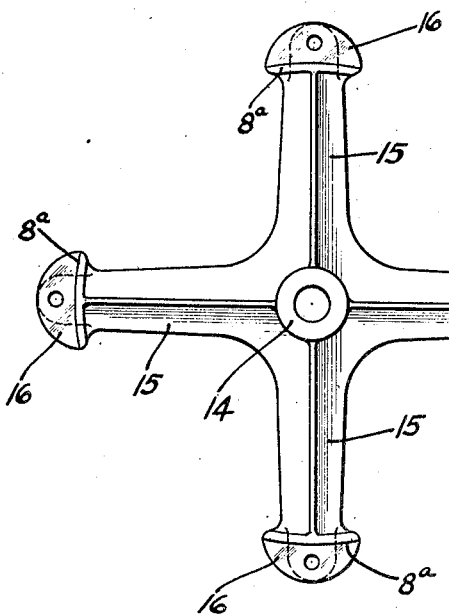
Figure 6 is a detail view of the spider removed from the wheel.

In Figure 4, I have shown a modified construction which consists in providing a cast rim 11 having a flange 12 for engagement with the head of the rail and the usual face to roll on the rail and provided interiorly with an inwardly projecting ring 13 located preferably about midway between the vertical faces or edges of the rim. The ring is located at this point as it is where the load is normally applied to the rim as it rolls on the track and the location of the ring or flange at this point permits the use of a rim of lighter construction in the rim portion than otherwise would be permissible and this of course reduces weight as well as the cost of material and adapts the wheel for light inspection cars which are moved on and off the track by hand and should be made as light as possible consistent with safety and durability. The position of this ring or flange at the gauge line or point of contact of the wheel with the rail makes it possible for me to use a cast rim of lighter construction than has generally been employed for this purpose. A hub 14 is provided having integral radiating arms 15 provided with the strengthening ribs described with reference to the previous figure and having at the outer end, shoulders 8ª corresponding to those described with reference to the previous figures, and seated against the curved edge of the flange 13 so that the load on the hub is directly transmitted through the arms 15 to the flange. The ends of the arms have webs 16 and bolts 17 firmly secure them to the flange. There may be any suitable number of these arms in this construction of wheel formed of two pieces as in the type previously described but with the rim cast instead of being made of strip steel as described with reference to the preferred construction. In either type of wheel, it is possible to remove a rim that has been worn or broken and substitute a new one therefor with comparatively little effort and expense.

By providing means for transmitting the load directly from the hub to the flange of the rim, all strain on the connecting bolts and the danger of shearing them is entirely eliminated.

Figure 1:
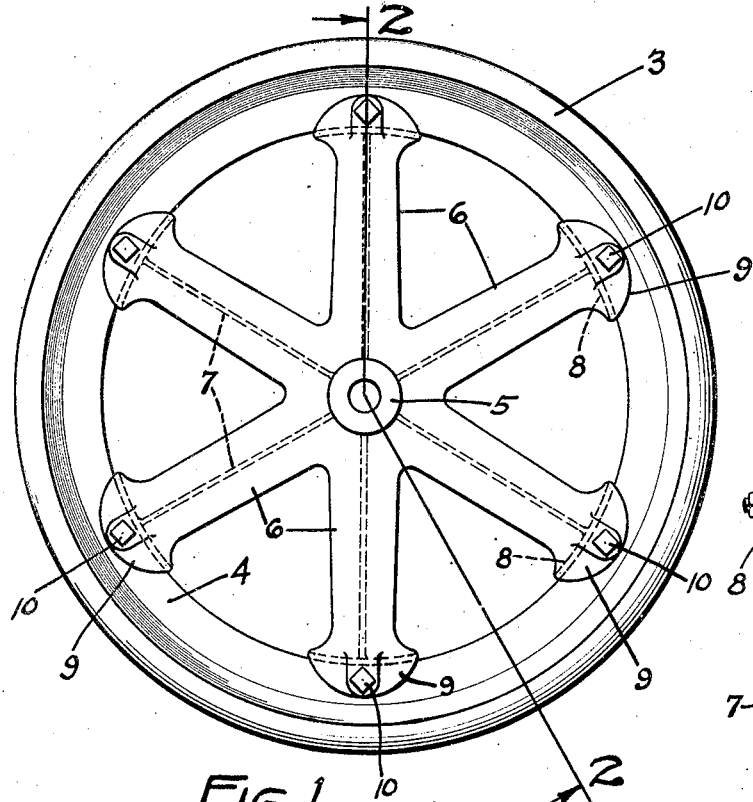
Figure 1 is a side elevation of a two-piece wheel embodying my invention.

From the foregoing description, it will be noted that this wheel is composed of a rim rolled from a single piece of metal with welded ends and fashioned to form the inwardly and outwardly projecting flanges and the hub and spokes are also formed in one piece, thereby eliminating the usual rivets employed for securing the hub and its supporting member together. With this wheel, it is possible to remove the bolts securing the spokes to the rim, substitute a new rim without disturbing the hub on the axle, and there is never any necessity for repairs as far as the connection between the spokes and hub is concerned. Frequently, in three-piece wheels, the rivets securing the hub and spoke member together work loose or break and have to be renewed. All this is eliminated in my improved wheel. I prefer the construction illustrated in Figure 1 of the drawings with the inwardly projecting flange at the edge of the rim, but it may be positioned in a cast rim intermediate to the edges thereof, if desired.

In various ways, the details of construction herein shown and described may be modified and still be within the scope of my invention.

I claim as my invention:

1. A two-piece wheel comprising an outer rim member and having an outwardly projecting rail-engaging flange, formed on one edge, and further having an inwardly projecting flange, a hub and supporting member comprising a series of spokes formed in one piece with said hub, said spokes having segmental circumferential seats, at their outer ends engaged with the inner edge of said inwardly projecting flange, and means securing the flange and spokes together.

2. A two-piece wheel comprising an outer rim member, having an outwardly projecting rail-engaging flange formed on one edge, and an inwardly projecting flange, a hub and supporting spider, comprising a series of spokes formed in one piece with said hub, each spoke having a segmental circumferential seat at its outer end engaged with the inner edge of said inwardly projecting flange, and means securing the flange and spokes together, each spoke having a web engaging against the face of said inwardly turned flange.

3. A two-piece wheel comprising an outer rim member and having an outwardly projecting rail-engaging flange formed on one edge, and further having an inwardly projecting flange, a hub and supporting spider comprising a series of spokes formed in one piece with said hub, each spoke having a segmental circumferential seat at its outer end engaged with the inner edge of said inwardly projecting flange, and means securing the flange and spokes together, each spoke having a reinforced web, one side of which engages the face of the inturned flange on that side nearest the rail-engaging flange.

4. A two-piece wheel comprising an outer rim member and having an outwardly projecting rail-engaging flange formed on one edge, and further having an inwardly projecting flange, a hub and supporting spider comprising a series of spokes formed in one piece with said hub, each spoke having a segmental circumferential seat at its outer end engaged with the inner edge of said inwardly projecting flange, and means securing the flange and spokes together, said spokes each having a strengthening rib tapering from the hub toward the seats.

5. A two-piece wheel comprising an outer rim member and having an outwardly projecting rail-engaging flange formed on one edge and further having an inwardly projecting flange, a hub and supporting spider comprising a series of spokes formed in one piece with said hub, each spoke having a segmental circumferential seat at its outer end, engaged with the inner edge of said inwardly projecting flange, and means securing the flange and spokes together, each spoke having strengthening ribs tapering from the hub toward the seat, and on the same side therewith.

6. A two-piece wheel comprising an outer rim member composed of rolled strip steel of comparatively thin stock having an outwardly projecting rail-engaging flange formed on one edge and an inwardly projecting flange formed on its other edge, a hub and supporting spider therefor comprising a series of spokes formed in one piece with said hub and radiating therefrom and seated at their outer ends on said inwardly projecting flange and adapted to transmit the load from said hub directly to said flange and rim, and suitable means securing said flange and spokes together.

In witness whereof, I have hereunto set my hand this 28th day of Jan. 1926.

WALTER F. KASPER.